(12) United States Patent
Vertanessian (10) Patent No.: US 10,581,373 B2
(45) Date of Patent: Mar. 3, 2020

(54) SOLAR LIGHT HUB AND ROUTER DEVICE

(71) Applicant: Alejandro Vertanessian, Partido de San Martin (AR)

(72) Inventor: Alejandro Vertanessian, Partido de San Martin (AR)

( * ) Notice: Subject to any disclaimer, the term of this patent is extended or adjusted under 35 U.S.C. 154(b) by 88 days.

(21) Appl. No.: 15/679,234

(22) Filed: Aug. 17, 2017

(65) Prior Publication Data

US 2018/0054158 A1   Feb. 22, 2018

(30) Foreign Application Priority Data

Aug. 17, 2016  (AR) .............................. P20160102517

(51) Int. Cl.
*H02S 40/22* (2014.01)
*F24S 23/30* (2018.01)
(Continued)

(52) U.S. Cl.
CPC .............. *H02S 40/22* (2014.12); *F24S 23/00* (2018.05); *F24S 23/30* (2018.05); *F24S 23/31* (2018.05);
(Continued)

(58) Field of Classification Search
CPC combination set(s) only.
See application file for complete search history.

(56) References Cited

U.S. PATENT DOCUMENTS

2008/0092877 A1* 4/2008 Monsebroten ........... F21S 11/00 126/683

* cited by examiner

*Primary Examiner* — Daniel P Malley, Jr.
(74) *Attorney, Agent, or Firm* — Defillo & Associates, Inc.; Evelyn A Defillo (57) ABSTRACT

A concentrator and a solar light router for converting light energy into electrical, photochemical and thermal energy, among other possible forms of usable energy, comprising a fixed body (1) and a movable part (2), wherein the fixed body (1) has an upper side with a converging lens (4) through which the sun rays (R1) enter, and a lower side where a mirror (5) is arranged. The mobile part 2 has a support arm 7 having a lower leg 8 coupled to a movement unit 10, and an upper leg 9 extending above the converging lens 4, in which is displaceable mounted a module (11) receptor/router of convergent solar rays (R4) that emerges from the fixed body (1). The support (7) is connected to angular displacement means housed in the movement unit (10) so that the angle traveled by its arm (9) encompasses a virtual surface (17), defined between the converging lens (4) and the module (11), where a focal point (19) incise of the convergent rays (R4), that travels according to the curvilinear paths (18n) in accordance with the displacement of the sunlight captured by the converging lens (4). The module (11) presents a lower face (13) through which the converging solar rays (R4) enters, and an upper face (14) from which concentrated solar rays (R5) are emitted which are directed, for example, towards a solar energy converter receiver (20) arranged in a tower (T) spaced from the device. The module (11) is connected to translation means along the upper section (9) of the support (7) and to rotating means with respect to its axis (E1) transverse to the defined plane by the converging lens (4) and includes means detecting the positions of the focal point (19), which together with the angular arm displacement means (7) and the translational and rotational means of the module (11) are connected to a module position control and control unit (11) to maintain it facing the focal point (19) and facing the receiver/solar energy converter (20) of the tower (T). In an alternate realization, the module (11) may act as a solar energy receiver/converter, for which it may include solar cells, a thermoelectric motor, or other solar energy converters.

18 Claims, 6 Drawing Sheets

(51) Int. Cl.
*F24S 50/20* (2018.01)
*F24S 50/00* (2018.01)
*G02B 19/00* (2006.01)
*F24S 23/00* (2018.01)
*F24S 23/70* (2018.01)
*F24S 25/00* (2018.01)
*G02B 3/08* (2006.01)

(52) U.S. Cl.
CPC ............... *F24S 23/70* (2018.05); *F24S 50/00* (2018.05); *F24S 50/20* (2018.05); *G02B 19/0028* (2013.01); *G02B 19/0042* (2013.01); *G02B 19/0076* (2013.01); *F24S 2025/01* (2018.05); *G02B 3/08* (2013.01); *Y02E 10/44* (2013.01); *Y02E 10/52* (2013.01)

SOLAR LIGHT HUB AND ROUTER DEVICE

FIELD OF THE INVENTION

The present invention refers to a concentrator and router solar light device, and more particularly, a specially developed device to concentrate and direct the sunlight to exploit and use its energy for various purposes, which may be, for example, installed as a replacement of the conventional heliostats in a solar thermal plant of concentration in the top of a tower, utilized autonomously to take advantage of the solar rays energy concentrated by the device, placing on it, photovoltaic conversion elements, photochemical, thermo mechanical, among other possible options.

STATE OF THE ART

As a prior art in the field, it is worth it to mention, for example, patent AR00764161, which claim priority of the NZ 286.894 of Thomas James Finnie, and the application AR090573A1 claiming priority over application IT RM2012A000135 of Magaldi Industries S.R.L.

The patent AR007641B1 protects a solar tracker and a solar energy collector capable of following the sun trajectory in two dimensions, of the type where the collector includes a base (3), a frame (4), a support frame (5) movable connected to the aforementioned frame (4), so that the connection means allow the movement of the frame (5) with respect to the frame (5) in two directions, and a plurality of concave parabolic mirrors (11) pivotally supported on the frame (5), so that each mirror (11) can be arranged to direct its light towards a focal point defined by an objective (6) fixed to the frame (5) and capable of containing liquid to be heated in circulation through it by means of a pump. A photovoltaic panel is rigidly connected to the frame (5) in order to direct the sunlight that impacts against the aforementioned photovoltaic panel and to generate electricity for the operation of control means. Two electric motors are connected to their respective drive means, being a motor for the rotation of the frame (5) in the azimuth plane around an azimuth pivot point, and other motor is used for lifting the frame (5) around a horizontal pivot point, in both cases, with respect to the base (3) of the device. The control means includes a battery, a control disposition based on time to rotate the frame (5) during daylight hours when the sun does not directly impact the mirrors (11), and to readjust the frame (5) to a point of departure for every day, and two provisions of light sensor capable of operating two engines to align the frame (5) in such a way that sunlight is reflected towards the objective (6). The invention includes isolated storage means for storing the liquid when it is not on target, and pipes for connecting the storage means with the aforementioned objective.

As is apparent from the foregoing, the device of patent AR007641B1 is intended to take advantage of solar energy to heat water to predetermined temperatures for later use. Taking into account the filing date of the corresponding patent application, that is to say twenty years ago, it can be assumed that the development of this device may have succeeded in solving with some efficiency the need to provide new and better techniques for the exploitation of the solar energy, compared to existing heliostats until then. However, the acquired experience, the technological advance, and the adverse aspects of this device, both structural and functional, have demonstrated the desirability of developing a device whose use is more versatile and that improves both the use of solar energy and the surface occupied in the place where it is installed.

One of the drawbacks of the device of the patent AR007641B1 lies in the fact that it is specifically intended for the water heating stored in a tank, which, at the present, constitutes an important limitation in the performance of the device. On the other hand, the structure of the device, formed by a plurality of parts coupled or fixed to each other, is such as to leave excessively exposed to the environment the components intended to receive, reflect, and concentrate the solar rays for the use of the energy generated from the same. Consequently, the operation of such components runs the risk of being affected by the accumulation of particles and/or the impact of rigid materials, which may deteriorate the various exposed surfaces. In addition, the distribution of said components form a broad and expanded structure, whereby both the assembly of the parts of the device, and the disassembly thereof for the purpose of repairing and/or transporting them, may require special precautions, all of which affects an increase of the general costs until the installation and start-up of the device, among other disadvantages.

The application AR090573A1 discloses a device for the storage and transfer of thermal energy associated with incident solar radiation that is used in a solar plant for the production of energy, based on an optical configuration of the plant that causes the solar radiation to converge from above. The device comprises a containment chamber (2) and a double bed (3) of fluidizable particles received within the containment chamber (2) and disposed one circumscribed to the other. The containment chamber (2) has at least one cylindrical receiving cavity (20) extending through the particle bed (3), an open top inlet (21) for receiving the solar radiation concentrated by a heliostats field, and an open or closed bottom (22) at the bed level of the particle bed. The complete layout is such that one of the particle beds (31) is located in contact with the side panel (23) of the cylindrical cavity (20) to store thermal energy received from the solar radiation, and the other bed of particles (32) is located in contact with bundles of tubes (41) crossed by the working fluid.

From the foregoing summary of the invention object of the patent application AR090573A1 and the figures which illustrate it in the specification, it is a device for using solar energy in a plant for the production of energy by means of the storage and transfer of thermal energy associated with solar radiation, which, as will be understood below, presents structural and consequently functional particularities, which differ significantly from the features of the device now proposed. Therefore, this document is mentioned for the sole purpose of providing another example of the prior art in the field.

SUMMARY OF THE INVENTION

In order to overcome the structural and functional limitations and drawbacks of the known devices, such as the one disclosed and protected by the patent AR00764161, the device of the present invention has been developed, which brings together outstanding advantages that arise as a result of its compact structure design that allows the preservation of mirrors, lenses, and other components against the action of aggressive external factors, as well as the versatility of use for the use of solar energy. In fact, this device can be used both to direct concentrated solar rays to a tower where they are installed, for example, converter panels of solar energy into electrical energy, thermal, etc. as well as an autonomously way to take advantage of the energy of the solar rays concentrated by the device placing in the same device elements of photovoltaic, photochemical, thermo mechanical conversion among others possible; the focus of the solar rays is realized with greater facility and precision than in the case of the conventional heliostats, in which the cost and the complexity of the control system are reduced remarkably; the energy receiver/converter elements of the solar rays concentrated by the device can be installed at a relatively low height, so high-rise towers are not required; the use of a large number of these devices considerably reduces the cost and complexity of the solar thermal energy plants of the tower; by placing several devices on flat ground, they do not shade each other, so that it is not necessary that the receiver element(s) and energy converters provided by the concentrated solar rays are located at a high altitude in a tower, nor to separate the mirrors among themselves such as should be located in the case of heliostats; the space between the devices on the ground can be minimal, which is optimum to the use of the available surface; and power plants may occupy smaller areas than conventional plants for the same power generated. Unlike conventional heliostats, it is not necessary to construct a heavy and firm reflective structure that must move with great accuracy to accommodate the changing position of the sun, since in the present device the moving part is small, light, and moves in a very small area.

It is therefore the object of the present invention to provide a concentrator device and a solar light router, which can be used both as a replacement for conventional heliostats in a solar concentrating thermal plant in a tower, as in an autonomous way, for the conversion of solar energy into photovoltaic, photochemistry, and thermo mechanical energy, among others. The device comprises a fixed body to which is attached a movable part, wherein the fixed body has an upper side where at least one converging lens is located, and a lower side, where there is at least one mirror. Through the lens of the fixed body, the solar rays enter parallel and become converging rays that are then reflected by the mirror, and again pass through the lens, which makes them even more convergent. The movable part is constituted by a support arm having a lower end that engages to a movement unit, and an upper end extending above said converging lens. In the upper end of the support arm is slidable coupled to a converging solar rays receiver/router module that protrudes from the fixed body and incident concentrates at a focal point on a virtual surface defined between the lens and the module. The receiver/router module has a lower face through which the convergent solar rays enter, and an upper face from which concentrated solar rays are directed, for example, towards a solar energy receiver/converter arranged in a tower located at a distance from the device.

The receiver/router module is connected to a translation device along the length of the support and a rotation device relative to its axis transverse to the plane defined by the converging lens. The support is connected to an angular displacement device accommodated in said movement unit such that the traveled angle by its upper arm comprises the virtual surface where the focal point is displaced according to a succession of curvilinear paths in accordance with the displacement of the solar light captured by the convergent lens of the fixed body. The receiver/router module includes a positioning sensor device for the positions of the focal point, which together with the angular displacement device of the support arm and the translating and rotating devices of the module are connected to a control and command unit of the positioning of the receiving/router module to keep it continuously facing the focal point and oriented to the solar energy receiver/converter of the tower. In an alternative embodiment, the module may act as a solar energy receiver/converter, for which it may include, for example, one or more solar cells, a thermoelectric motor, among other possible types of solar energy converters.

BRIEF DESCRIPTION OF DRAWINGS

For more clarity and understanding of the present invention, it has been illustrated in several figures which represent it according to preferred embodiments, all by way of example, wherein.

DETAILED DESCRIPTION OF THE INVENTION

FIGS. 1 to 4 show the concentrator and solar energy router device of the present invention including a fixed body 1, which rests in a predetermined position on the floor or the ground where the device is installed, and a movable part 2 projecting from a perimetral section of the fixed body 1, which receives the concentrated solar rays emerging from the fixed body 1 in accordance with the changing positions of the sun in the course of the day and during different times of the year.

Figure 1:
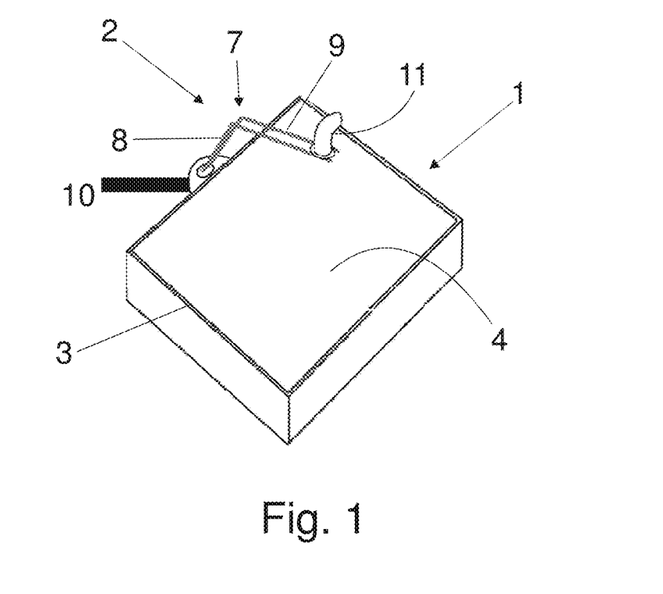
FIG. 1 is a top perspective view of the device object of the present invention.
Figure 2:
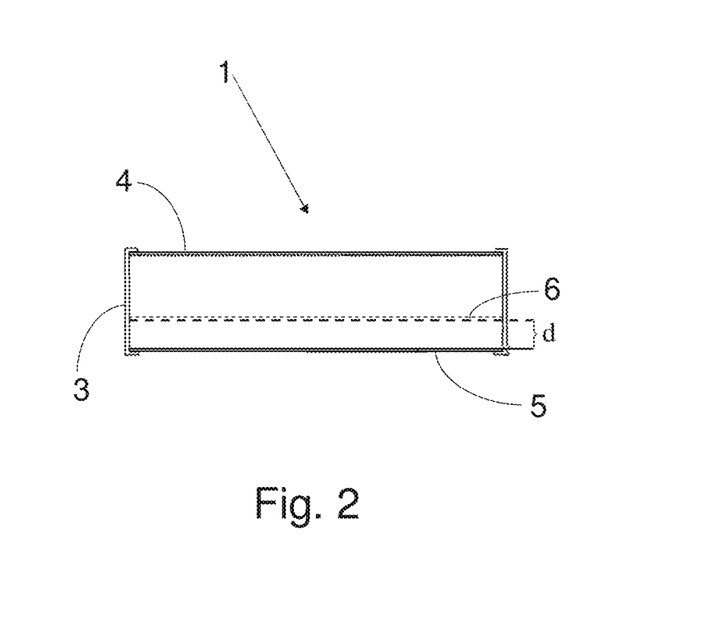
FIG. 2 is a side cross-sectional view of the fixed body of the device shown in FIG. 1.

The fixed body 1 is formed by an outer frame 3, which can take various geometric configurations, for example, quadrangular as illustrated, but always with a flat top surface, and optionally may include support legs (not illustrated). The upper side of the fixed body 1 is defined by a plane-convergent lens 4, preferably a Fresnel-type lens, while on the bottom side or base includes a mirror 5. The lens 4 and the mirror 5 are firmly fixed in position by half of the frame 3.

According to alternative embodiment, the mirror 5 may be either a flat or a convergent mirror so that, in the second option, it acts as a convergent lens, thus contributing to the concentration of the sun rays. Optionally, it can be added, at an intermediate distance d between the lens 4 and mirror 5, a second converging lens 6 Fresnel type, illustrated in dashed lines in FIG. 2, further enhancing the convergence effect of the reflected solar rays toward the upper lens 4 when convenient.

Although essentials to achieve the convergence of the sun's rays, in such a way that they are focused and captured by the module 11, it is sufficient to use the lens 4 and the plane mirror 5, either plane or convergent, when taken in to practice the device that the present invention provides, for example, the following combinations as alternative realization:

A top plane convergent lens and a convergent mirror;

A top plane convergent lens, an intermediate convergent lens, plus a flat mirror;

A top plane convergent lens, an intermediate plane convergent lens, and a convergent mirror;

Two or more intermediate converging lenses and a flat mirror;

Two or more intermediate converging lenses and a converging mirror.

It should be mentioned that the higher efficiency of the concentrated solar energy, and consequently the greater efficiency of the device, is achieved by using the least amount of lenses to avoid losses, for example, due to the light dispersion within the lenses. That is, the best result in terms of the energy utilization of the concentrated solar rays by the device is obtained by using the upper lens 4 and the Fresnel-type plane or convergent mirror 5. However, in certain ambient conditions, where solar radiation is considerably strong, energy losses from the use of two or more converging superimposed lenses, and with their aligned optical axes, may be practically negligible compared to the result obtained.

Figure 3:
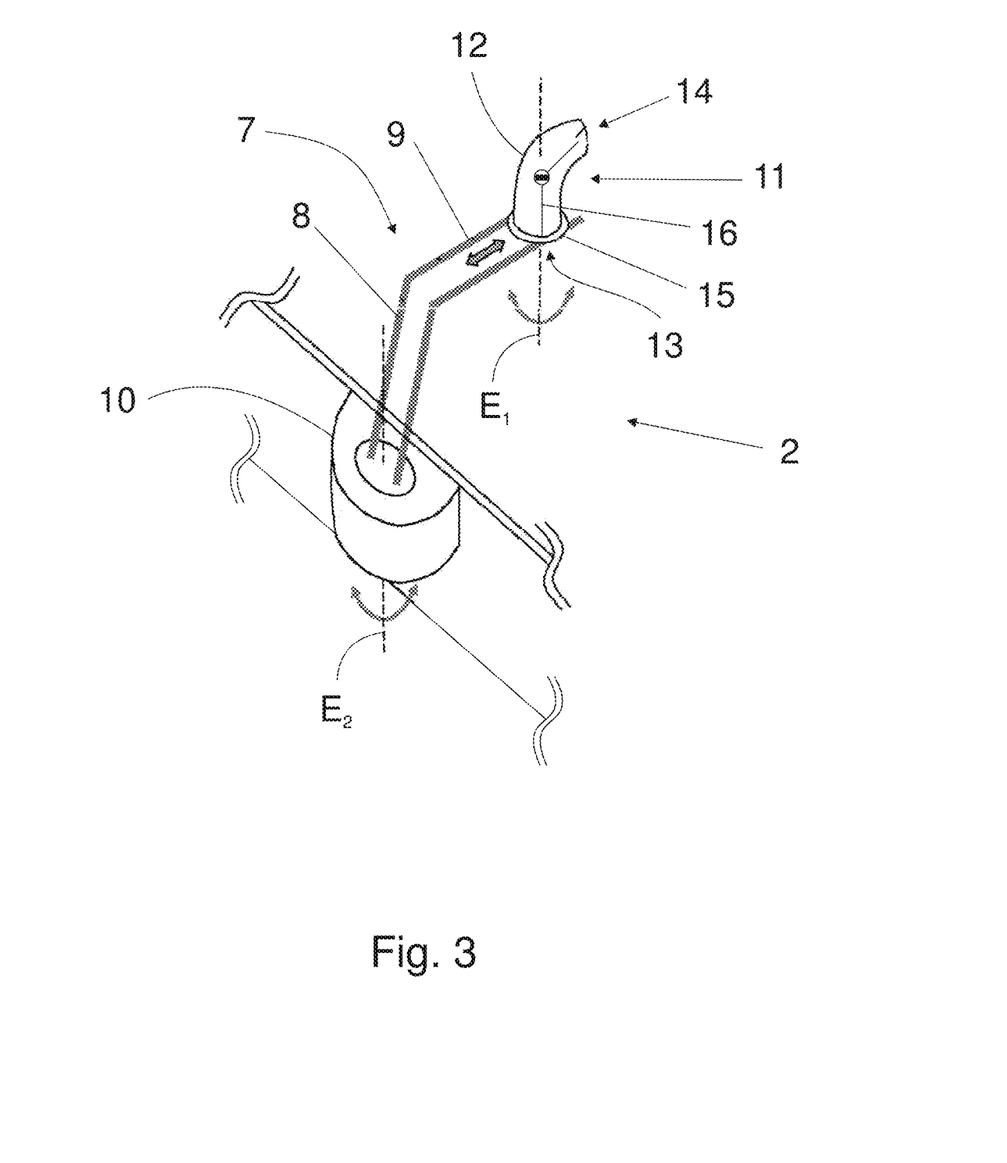
FIG. 3 is a partial and perspective rear view of the device illustrating the concentrated light-ray receiver/router module mounted in the upper section of a support arm whose lower section is coupled to a movement unit.

The movable part 2 includes a support arm 7 formed by a first section 8 that rises laterally from the fixed body 1, and a second section 9 extending above the lens 4 to a middle area of the surface thereof. Said first section 8 of arm 7 can raise both vertically and tilted toward the surface of the plate 4. The lower end of the section 8 is connected to a movement unit 10 laterally integral with the frame 3 of the fixed body 1, and over the section 9 there is displaceable mounted a module 11 which, in accordance with the alternative embodiment, can be both a receiver/router for sun rays, and a receiver/converter of light energy in electrical energy, photochemistry, etc., as it will be explained later.

The body of said module 11 is formed by a bent housing 12, preferably constructed of sunlight transparent materials, has a lower face 13 through which the concentrated solar rays enter, which are projected from the fixed body 1 through the lens 4, and an upper face from which the concentrated solar rays are directed towards a receiving device located, for example, in a tower. The module 11 is coupled to the upper arm 9 of the support 7 by means of a frame 15 disposed at the lower end of the bent housing 12, and includes an adjustable support 16 that allows to regulate the exit direction of the solar rays. The lower face 13 is polished and, optionally, may have an anti-reflective coating. The upper face 14 is also polished and may have a curvature so as to further concentrate the rays emitting towards the receiver/solar energy converter arranged in the tower. In an embodiment, the module 11 as a sunbeam router towards a tower where at a certain height a solar energy receiver/converter is located, in the interior of the bent housing 12 a bunch of optical fibers or a set of mirrors and/or prisms are housed that by surface reflections and/or internal reflections drive concentrated lightning towards the receiver/solar energy converter located in the tower. In alternative embodiments, the module 11 may contain a solar cell or set of solar cells, a thermoelectric apparatus, a thermal motor, or any other device capable of taking advantage of the concentrated light energy.

The module 11 is movable along the upper section 9 of the support 7, can rotate with respect to its axis E1 perpendicular to the plane of the lens 4 of the fixed body 1, and according to the axis of rotation E2 of the movement unit 10 the support 7 with the module 11 can be angularly displaced parallel to the plane of the lens 4. The movements of the module 11 are performed automatically as the position of the sun changes and always in the position where it receives the most concentrated light. The displacement of the module 11 along the upper section 9 of the support arm 7 is driven by means of one or more linking members. Both the linear displacement along the upper span and the angular movement of the support 7 allow the module 11 to follow the position of the concentration, which changes both throughout the day and the year. The angular movement of the housing 12 is small and allows adjusting the direction of the rays emerging from the module 11, so that they always strike the receiver of the tower.

In order to perform these functions, the movement unit 10 receives information from one or more sensors placed below the frame 15 of the module 11 and, by means of one or more control devices, commands the motors that drive the movement of the module 11 through the length of the arm 9 of the support 7 and the angular movement of the latter.

Figure 4:
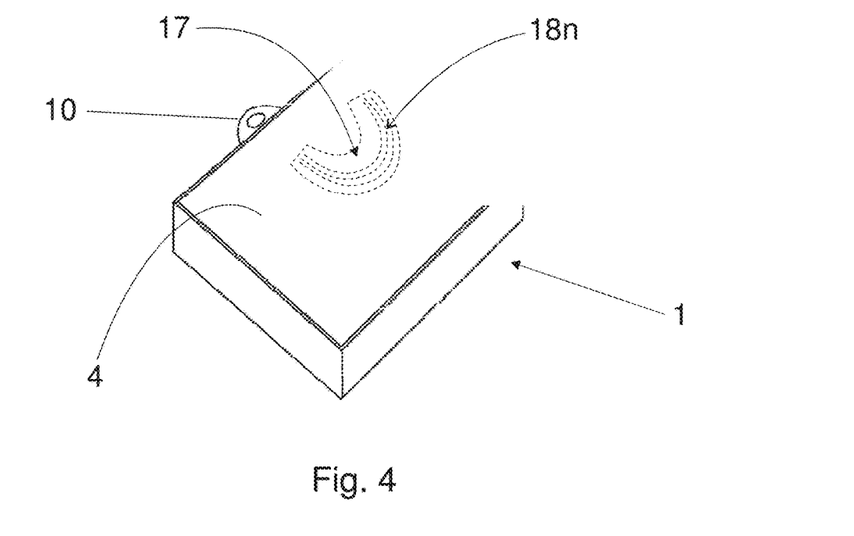
FIG. 4 is a partial perspective view of the fixed body of the device showing the surface of a crescent shaped sector covering all the curvilinear paths described by the focal point where the sun's rays are captured in accordance with the displacement of the sun in the course of the day for a full year.
Figure 5:
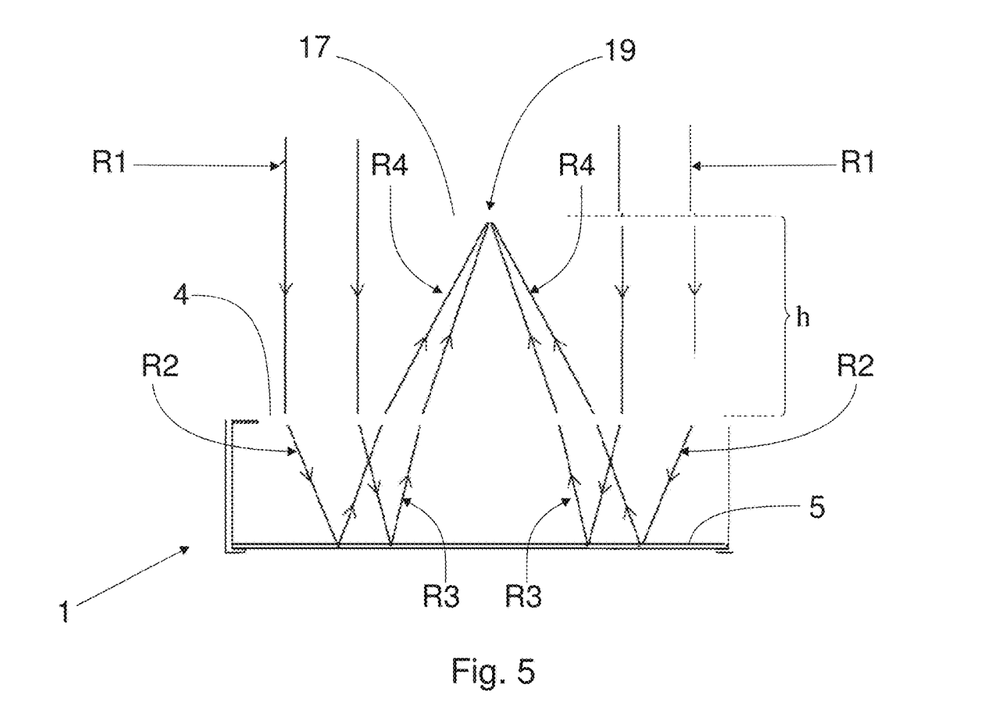
FIG. 5 is a side cross-sectional view of the fixed body of the device where the path and transformation of the parallel solar rays in convergent rays is represented by means of the stated fixed body.

From the tests carried out, as shown in FIGS. 4 and 5, the virtual surface 17 and curvilinear trajectories in the crescent shape 18 where they converge, at a certain distance h from the lens 4 of the fixed body 1, the concentrated solar rays emerging through said lens 1 and are continuously captured by the module 11 during the displacement of the sun. As the position of the sun changes, the light rays are always focused on stated virtual surface 17, which allows capturing at all times the largest amount of rays concentrated in the lower face 13 of the module 11.

As shown schematically in FIG. 5, the parallel solar rays R1 that incident and pass through the lens 4 of fixed body 1 are refracted into convergent rays R2, which are then rays R3 reflected by the mirror 5, until they pass again through the lens 4, thus emerging from the fixed body 1, which transforms them into R4 rays even more convergent and are concentrated at a focal point 19 of the virtual surface 17 defined at a distance h from the plane defined by the surface of the lens 4. That is to say, the parallel solar rays R1 incident on the upper surface of the fixed body 1 defined by the lens 4 of the device are subjected to refraction by means of the lens 4 and reflection in the mirror 5, transforming the parallel rays R1 into the convergent rays R4, which are concentrated at a focal point 19 defined on the virtual surface 17 in accordance with the corresponding path determined by the displacement of sunlight. If instead of the flat mirror 5, a Fresnel concave mirror is used, the convergence effect of the rays is further accentuated, whereby the distance h between the virtual surface 17 and the lens 4 would be smaller. If the dimensions of the fixed body 1 are, for example, 2 m on the side and 20 cm in thickness, the distance h will be on the order of 70 cm to 80 cm, which values will depend on the convergence capacity of the lens (s), as well as the mirror 5, i.e. flat or convergent.

As the position of the sun changes, so does the location of the focal point 19 on the virtual surface 17, so that the focal point 19 is displaced on one of the curved paths 18*n*. While each day of the year corresponds to a slightly different path 18*n*, all these paths 18*n* are included within the virtual surface 17. The area of the virtual surface 17 is much smaller than the net surface of the lens 4 of the fixed body 1 and consequently it is sufficient that the displacement of the module 11, both linear and angular, reaches to cover only the area of the virtual surface 17 to capture the energy of the concentrated solar rays converging at the focal point 19.

Taking as reference example the dimensions of the fixed body 1 mentioned above, the virtual surface 17 is 50 cm between longitudinal ends and 30 cm between the edges which determine its maximum transverse width, and the area encompassed by the multiplicity of possible focal points 19*n* is of the order of 3 to 4 cm2. The support 7 should, for example, rotate an angle of 30° to one side of the center position and 30° to the opposite side, and the linear displacement of the module 11 along the arm 9 will be approximately 40 cm.

Figure 8:
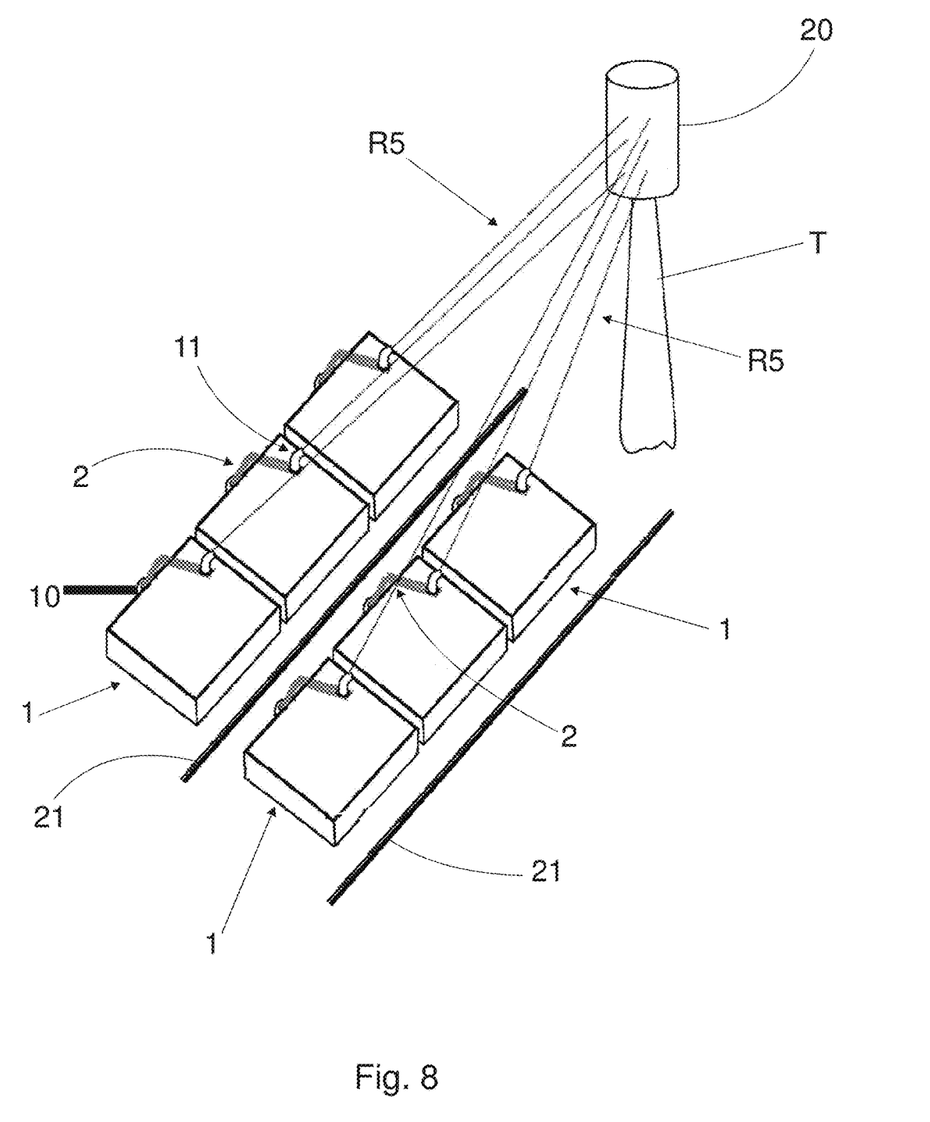
FIG. 8 is a perspective view that schematically illustrates a plurality of devices, rails for moving of cleaning equipment to keep the surfaces of the devices free of dust and clogs, a tower where there are installed one or more receivers and/or energy converters, and represented concentrated solar rays directed from each device to the energy receiver(s) in the tower.

FIG. 8 shows the way in which a large number of concentrator devices and solar light routers according to the present invention are combined in a collector field tower of a solar thermal plant, where one can observe the way in which the concentrated solar rays R5, which each device directs from each module 11 to the receiver 20 of a tower T. Let's say that receiver 20 may be, for example, a receptacle through which molten salts flow, which serve as a fluid for transporting and storing the heat captured which is then converted by means of a heat exchanger into steam to move a turbine generator, or in the receiver 20 the hot bulb of a sterling type heat engine can be placed with a coupled electric generator or by the receiver 20 a fluid that is required to heat for a given chemical process can circulate.

The arrangement of devices, illustrated as one of several possible options, enables rails 21 to be moved for the movement of, for example, automatic cleaning equipment used to keep the surfaces of each device free from dust, leaves, or other materials of any nature that may hinder or prevent the normal operation of the devices.

Figure 6:
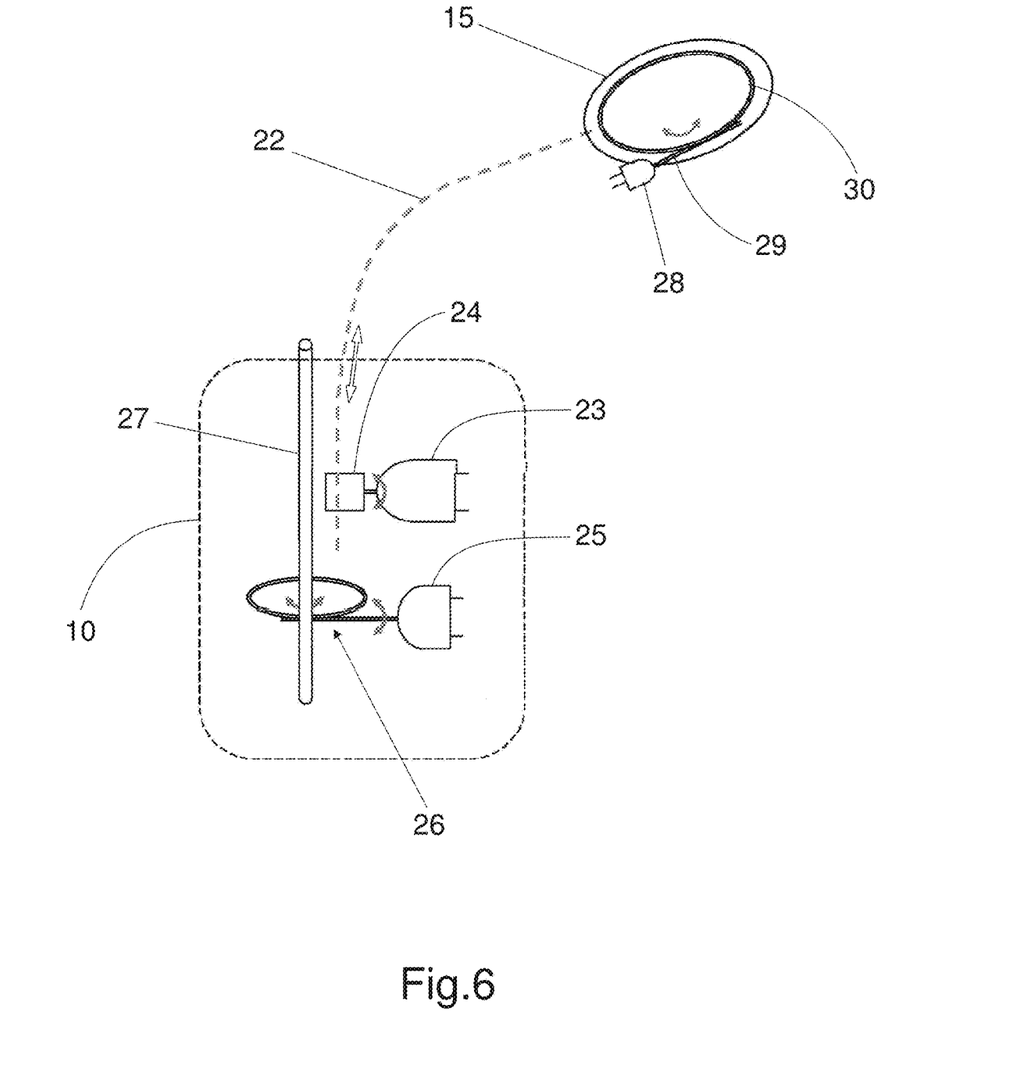
FIG. 6 schematically illustrates the components of the movement unit incorporated in the fixed body of the device for moving and positioning the concentrated solar receiver/router module in accordance with the changes in the angle of incidence of the sun's rays in the stated fixed body during the day.

The mechanisms for moving and positioning the module 11 as a function of the displacement of the focal point 19 on the virtual surface 17 according to the paths 18*n* have been developed to perform at least three movements: translation of the module 11 along the arm section 9 of the support 7, angular displacement of the support 7 and rotation of the module 11. To do this, as illustrated in FIG. 6, the translation movement along the arm section 9 of the support 7 is affected by an elongated flexible element 22, which links the frame 15 of the module 11 with a translation motor 23 located within the movement unit 10. Such a flexible element 22 may be, for example, a metal or plastic tape resistant to solar radiation and extreme temperatures, or a flexible cable movable along a metal mesh, among other possible alternatives. The translation motor 23 is coupled to a first end of the flexible element 22 through a speed reducer 24 by means of which the rotational movement of its axis is converted into a linear displacement of the flexible element 22 and, consequently, the advancement and backward movement of the module 11 along the arm 9 of the support 7.

The angular displacement of the support 7 is carried out from a motor 25 which, by means of a speed reducer 26 worm-crown type, converts the rotation in both directions of the axis of the aforementioned motor 25 into a slow rotation of the axis 27 of the stated speed reducer 26, in either direction, to which the proximal end of the section 8 of the support 7 is coupled. The crown-worm-type speed reducer 26 mechanism allows the position of the support 7 to be kept firm even in the presence of strong winds.

The rotational movement of the module 11 is affected by means of a small adjusting motor 28, on which rotation axis is coupled a worm screw 29 associated with an annular rack 30 located on the frame 15 of said module 11. By means of three or more light sensors located below the frame 15 of the module 11 and with one or more control devices ensures that, as the relative position of the sun changes, the router will always receive the maximum light intensity concentrated on its lower face 13, and at the same time, that its upper face 14 always directs the rays towards the receiver 20 located in the tower T. For this to happen, the module 11 must always follow the displacement of the focal point 19 on the virtual surface 17 due to the movement of the sun and, in turn, should rotate slightly to point the rays always towards the receiver 20 of the tower.

Figure 7:
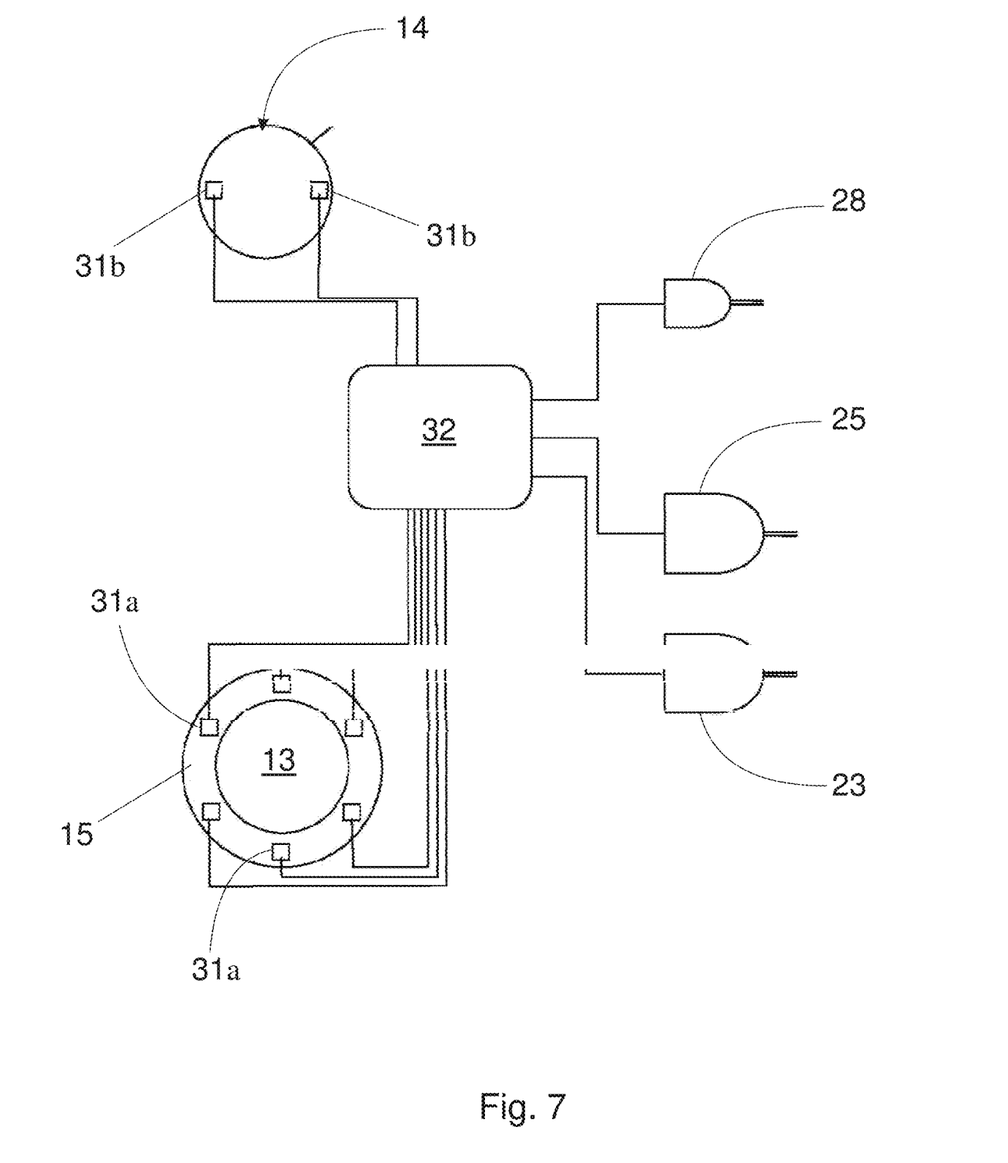
FIG. 7 shows schematically and in block diagram the sensing and control system used in the device for detecting the changes in the intensity of sunlight received by the device and activated the movement device and the positioning of the router module.

A plurality of light sensors 31*a* are arranged in the lower face 13 of the module 11, and more precisely in the frame 15, which in the illustrated embodiment is a set of six sensors equidistantly distributed according to a circumference defined in the frame 15 of the module 11. When the focal point 19 changes position, the intensity of the concentrated rays is different in two or more of the sensors 31*a*; each sensor 31*a* sends the signal corresponding to an electronic processor 32 which, by a predetermined algorithm, compares all the signals to each other. Upon detection of the light intensity differential Δi produced between sensors 31*a*, the processor 32 sends the corresponding instructions for activating the translation motor 23 of the module 11 on the arm 9 of the support 7, and/or the rotation motor 25 of the support 7, so that they rotate in such direction that the module 11 is again positioned to capture from the focal point 19 the maximum intensity of concentrated light. This is achieved when the signals of all the sensors 31*a* are equal, and upon reaching this condition, the rotation of the translation motor 23 and rotation 25 is interrupted, the module 11 remaining in that position until the focal point 19 is again displaced by generating again a differential Δi of light intensity, and then resuming the sequence previously described.

In addition, two or more light sensors 31*b* facing the receiver 20 of the tower T are arranged on the upper face 14 of the module 11, which, having a high luminosity which radiates in all directions, acts on said sensors 31*b*, which send signals to the electronic processor 32. By another algorithm, the processor 32 compares the signals emitted by the sensors 31*b* with each other and sends the instructions corresponding to the motor 28 to slightly turn the module 11 in the proper direction until it re-points towards the receiver 20 of the tower T. Analogously to what is explained with respect to the sensors 31*a*, when the light intensity received by the sensors 31*b* is adjusted by adjusting the position of the module 11, the rotation of the motor 28 and the module 11 remains in that position until the focal point 19 is again displaced generating a differential of light intensity Δi, whereby the sequence is already described. The rotation of the module 11 by the detection of Δi in the sensors 31*b* is a very fine adjustment of its angular position, which, for example, is on average 1 degree or less.

Having thus specifically described and determined the nature of the present invention and the manner in which it will be practiced, it is declared to claim as property and exclusive right:

The invention claimed is:

1. A concentrating device and a solar light router, the device continuously captures solar rays following a sun movement from sunrise to sunset, the device comprising:
   a fixed body (1); and
   a movable part (2);
   the fixed body (1) having an upper side and a lower side spaced apart from each other;
   at least one converging lens (4) being located on the upper side of the fixed body (1), the converging lens (4) being arranged for the ingress of solar rays (R1) in parallel;
   at least one mirror located on the lower side of the fixed body (1), the at least one mirror reflects an output of converging solar rays;
   the movable part (2) includes a support arm (7) connected to an angular displacement device located above the converging lens (4);
   a module (11) concentrated solar radiation receiver (R4) projecting from the fixed body (1), the module (11) including a lower face (13) and an upper face (14) respectively of ingress and output of concentrated sunrays, the module (11) is connected to a translation device along a section (9) of the support arm (7) and to a rotating device about an axis (E1) transverse to a plane defined by the converging lens (4);
   the module (11) includes a detecting device that moves according to various paths of a focal point (19), the focal point (19) is formed by concentrated solar rays (R4) projecting from the fixed body (1) converging on a surface (17) defined between the lens (4) and the lower face (13) of module (11);
   the detecting device, the angular movement device of the support arm (7), and the translation and rotation device of the module (11) are connected to a control unit to maintain the device continuously facing the focal point (19) and directed towards a solar energy converter receiver.

2. The device according to claim 1, wherein the translation device of the module (11) includes a motor (23) with a speed reducer (24) housed in a moving unit and an enlarged flexible element (22), which opposite ends are respectively fixed to the speed reducer (24) and to an annular frame (15) of the module (11) arranged on the lower face (13) thereof.

3. The device according to claim 2, wherein the flexible element (22) is a metal strip, a plastic tape resistant to solar radiation and extreme temperatures, or a cable along a metallic mesh.

4. The device according to claim 1, wherein the angular displacement device of the support arm (7) includes a speed reducing motor (26) housed in a movement unit (10), being coupled to a pivot axis (27) of the speed reducing motor (26), the lower end of a first section (8) of the support arm (7) in which the section (9) is mounted in the module (11).

5. The device according to claim 2, wherein rotating the module (11) is defined by a motor (28) from an axis of rotation of which there is projected a worm screw (29) associated with an annular rack (30) arranged in the annular frame (15) of the module (11).

6. The device according to claim 2, wherein the detecting device of the focal point (19) is defined by at least three light sensors (31a) located in diametrically opposed positions in the frame (15) of stated module (11) or by a plurality of light sensors (31a) equidistantly arranged in the frame (15) of stated module (11).

7. The device according to claim 2, wherein inside the module (11) are housed conductive optical fibers for converging solar rays (R4) from the lower face (13) to the upper face (14) of the module (11), a set of reflecting mirrors for driving the converging solar rays (R4) from the lower face (13) to the upper face (14) of the module (11); or a set of prisms for the conduction of concentrated solar rays from the lower face (13) towards the upper face (14) of the module (11).

8. The device according to claim 2, wherein in the upper face (14) of the module (11) are at least two luminal disposed sensors (31b) facing a light reflecting surface of an energy converter receiver (20) located in a tower (T) spaced from the device.

9. The device according to claim 2, wherein inside the module (11) is housed at least one solar cell.

10. The device according to claim 2, wherein inside the module (11) is housed a thermoelectric motor.

11. The device according to claim 1, wherein the mirror (5) is a convergent plane mirror.

12. The device according to claim 1, wherein the lenses (4) and the mirror (5) includes at least a second lens (6).

13. The device according to claim 12, wherein the lens (6) is a plane-convergent Fresnel lens.

14. The device according to claim 1, wherein the lens (4) is a plane-convergent Fresnel lens.

15. The device according to claim 1, wherein the lower face (13) of the stated module (11) has an anti-reflective coating.

16. The device according to claim 1, wherein the body of the module (11) is formed by a bent housing (12) constructed of materials transparent to sunlight.

17. The device according to claim 1, wherein the module (11) includes an adjustable support (16) for regulating the output direction of the concentrated solar rays.

18. The device according to claim 1, wherein the fixed body (1) is a quadrangular frame (3).

* * * * *